United States Patent [19]
Dino

[11] Patent Number: 5,646,093
[45] Date of Patent: Jul. 8, 1997

[54] MODIFIED POLYGALACTOMANNANS AS OIL FIELD SHALE INHIBITORS

[75] Inventor: David Joseph Dino, Cranbury, N.J.

[73] Assignee: Rhone-Poulenc Inc., Cranbury, N.J.

[21] Appl. No.: 696,097

[22] Filed: Aug. 13, 1996

Related U.S. Application Data

[63] Continuation of Ser. No. 304,996, Sep. 13, 1994, abandoned.

[51] Int. Cl.$^6$ .................................................. C09K 7/02
[52] U.S. Cl. ................................................ 507/209; 507/110
[58] Field of Search .............................. 507/110, 905, 507/209

[56] References Cited

U.S. PATENT DOCUMENTS

| | | | |
|---|---|---|---|
| 2,802,783 | 8/1957 | Weiss et al. | 252/8.5 |
| 3,017,351 | 1/1962 | Scott et al. | 252/8.5 |
| 3,483,121 | 12/1969 | Jordan | 252/8.55 |
| 4,299,710 | 11/1981 | Dupre et al. | 252/8.5 |
| 4,341,645 | 7/1982 | Blattel et al. | 252/8.5 |
| 4,549,907 | 10/1985 | Kohn | 507/110 |
| 4,634,538 | 1/1987 | Alexander | 507/110 |
| 4,647,385 | 3/1987 | Williams et al. | 507/110 |
| 4,707,281 | 11/1987 | Miller et al. | 507/110 |
| 4,743,384 | 5/1988 | Lu et al. | 507/110 |
| 4,826,700 | 5/1989 | Bayerlein et al. | 507/110 |
| 4,830,735 | 5/1989 | Debras et al. | 208/244 |
| 4,870,167 | 9/1989 | Zody et al. | 536/114 |
| 4,894,335 | 1/1990 | Peignier et al. | 507/110 |
| 4,941,981 | 7/1990 | Perricone et al. | 252/8.51 |
| 4,956,104 | 9/1990 | Cowan et al. | 507/110 |
| 5,128,462 | 7/1992 | Zody | 536/114 |
| 5,179,083 | 1/1993 | Zody et al. | 514/54 |
| 5,233,032 | 8/1993 | Zody et al. | 536/114 |

FOREIGN PATENT DOCUMENTS 0323627  12/1988  European Pat. Off. ........ C08B 37/14

OTHER PUBLICATIONS

Polyacrylamide/Potassium–Chloride Mud for Drilling Water–Sensitive Shales, Journal of Petroleum Technology, Jun. 1976, pp. 719–727 Author, R. K. Clark.

*Primary Examiner*—Philip Tucker
*Attorney, Agent, or Firm*—Andrew M. Solomon

[57] ABSTRACT

Polygalactomannans containing a hydrophilic substituent and a hydrophobic substituent are useful as oil shale inhibitor compositions in oil well drilling fluids.

9 Claims, No Drawings

MODIFIED POLYGALACTOMANNANS AS OIL FIELD SHALE INHIBITORS

RELATED APPLICATIONS

This application is a continuation of application Ser. No. 08/304,996, filed Sep. 13, 1994, now abandoned.

This application is related to the subject matter disclosed in U.S. Ser. No. 546,560 filed Jun. 29, 1990 now U.S. Pat. No. 5,233,032.

FIELD OF INVENTION

This invention relates to drilling fluids utilized in oil well drilling operations. More particularly, the present invention relates to shale stabilizers, to drilling fluids comprising such stabilizers and to a method of use thereof to stabilize shale formations encountered during an oil well drilling operation.

More particularly, the present invention relates to polysaccharide derivatives comprised of a polygalactomannan copolymer that contains at least one hydrophilic and one hydrophobic substituent. These copolymers are effective as shale hydration inhibitors and can be added to a drilling fluid and circulated through a shale formation whereby shale sloughing during an oil well drilling operation is significantly reduced.

BACKGROUND OF THE INVENTION

Most oil well systems utilize a rotary drill bit for drilling a subterranean well. This system utilizes a column of drill pipe that is attached to a multi-faceted drill bit which rotates as it is forced downward through the soil and rock. The drill bit cuts into the soil and rock and this creates ground cuttings and debris that accumulate in the drilling container. Hence, a drilling fluid must be employed to carry the excavated cuttings to the surface for removal. This is necessary to prevent jamming and clogging of the drill bit and pipe and to keep the bottom of the hole clean at all times.

To remove cuttings produced during an oil well drilling operation, a drilling fluid is circulated down the drill pipe and up the annulus between the drill pipe and the formation whereby the cuttings are carried to the surface. The cuttings are then shaken out of the drilling fluid and the fluid is recirculated. In addition to removing the cuttings, the drilling fluid must also coat and lubricate the drill bit and stabilize the shale formation.

In some areas, formations known as heaving or sloughing shales are penetrated during a well-drilling operation. These shales have a tendency to swell or crack upon contact with the drilling fluid whereupon the bore hole walls are rendered unstable and the heaving shale material, which makes up such walls, sloughs and caves into the bore hole. Sloughing of shale material into the bore hole can cause the drill stem to become stuck and can enlarge the bore hole with the result that large subterranean cavities are formed. Furthermore, where sloughing occurs while the drilling bit is being changed at the surface, the bore hole fills up and must be cleared before drilling can proceed. In addition, the heaving shale material taken up into the drilling fluid adversely affects the viscosity characteristics of the drilling fluid to the point where the fluid must be chemically treated to reduce the viscosity thereof or it must be diluted followed by the addition of weighing material to maintain a given mud weight.

This drilling fluid then not only must carry drill cuttings to the surface of the well but must also control formation pressure and maintain stability of the surrounding rock and soil formation in the uncased sections of the bore hole. They must also protect productive formations as well as cool and lubricate the drill bit and drill string. Hence, a drill fluid must have certain chemical and physical characteristics such as low fluid loss or filtration control, solid suspension power, shale inhibition, insensitivity to shear, thermal stability and the like.

A wide variety of additives have been utilized in drilling fluids to stabilize shale formations encountered during oil well drilling operations. For example, Weiss et. al. U.S. Pat. No. 2,802,783 discloses saturating an aqueous drilling fluid with calcium hydroxide; Scott et. al. U.S. Pat. No. 3,017,351 discloses incorporating into the drilling fluid an acetate salt of an amide of a fatty acid and a polyamine along with ammonium sulfate, oil and an acrylamide polymer hydrolyte; Blattel et. al. U.S. Pat. No. 4,341,645 discloses slats of copolymers of acrylic acid and hydroxypropyl acrylate; while Dupre et. al. U.S. Pat. No. , 4,299,710 discloses the combination of an acid-containing polymer and a polysaccharide wherein the acid-containing polymer can be a copolymer of any one of a long list of saturated carboxylic acids, including acrylic acid on a half-amide of a dicarboxylic acid, with any one of a long list of vinyl monomers, including 2-hydroxyethyl and hydroxypropyl acrylates. These additives all require the formation of salts in order to be utilized in aqueous-based drilling fluids. The potassium chloride salts of polyacrylamide and modified starch have also bene used as shale stabilizer compositions in drilling mud for water sensitive shales in wells Clark et. al. J. Petrol Tech. pp 719–727 (June, 1976).

Polygalactomannans and their derivatives are well known compositions which have many uses as thickening agents in aqueous systems. They are polysaccharides composed principally of galactose and mannose units and are usually found in the endosperm of leguminous seeds, such as guar, locust bean, honey locust, flame tree and the like. Guar gum, for example, is composed mostly of a polygalactomannan which essentially is a straight chain polymannan with single-membered galactose branches. The ratio of galactose to mannose units in the guar polymer is 1:2.

Locust bean gum is a polygalactomannan of similar molecular structure in which the ratio of galactose to mannose is 1:4. Guar and locust bean gums are the preferred sources of the polygalactomannans, principally because of their commercial availability.

Derivatives of polygalactomannan gums are made by reacting the gums with various derivatizing agents, which react with the hydroxyl groups of the gums to form ethers or esters. For example, hydroxyalkyl ethers of polygalactomannans are made by reacting alkylene oxides with the gums as disclosed in U.S. Pat. No. 3,483,121. The galactose and mannose sugar units of polygalactomannans each have an average of three reactive hydroxyl groups. These react with alkylene oxides to produce hydroxyalkyl ethers of the gums. Each unit of alkylene oxide added to the polygalactomannan in turn adds a new hydroxyl group which is itself reactive. Theoretically, there is no limit to the amount of alkylene oxide which may be added to the polygalactomannan. As a practical matter, however, a molecular substitution (M.S.) of about 4 or 5 is a practical upper limit.

In U.S. Pat. No. 4,870,167, alkyl ethers of polygalactomannans are disclosed wherein the alkyl groups contain 1 to 4 carbon atoms which are further modified with long chain aliphatic epoxides wherein the long chains contain 8 to about 28 carbon atoms. Such polygalactomannans are particularly useful as thickening agents for aqueous systems.

Perricone et. al. U.S. Pat. Nos. 4,941,981 and 4,830,765 disclose modified non-polluting liquid phase shale swelling inhibition drilling fluids comprised of a liquid phase consisting of sea water or brine with water soluble alcohols, glycol, polypropylene glycols and the like dissolved therein. A viscosifier is added in order to suspend the solids in the aqueous phase together with a filtration control agent.

Lee et. al. U.S. Pat. No. 4,743,384 discloses a drilling fluid composition consisting of aqueous phase comprised of fresh, brine or seawater and a carboxymethyl guar gum and a metal salt selected from the group consisting of water soluble metal carbonates and bicarbonates. The drilling fluid allegedly exhibits the requisite rheological and fluid loss properties as well as excellent clay and shale inhibition with enhanced thermal stability.

In European Patent Application No. 323,627, which was published Jul. 7, 1989, polygalactomannan derivatives containing both hydrophilic substituents and hydrophilic substituents are described.

The present invention provides oil shale stabilizers which can be added to a drilling fluid to eliminate or significantly reduce shale swelling. The shale stabilizers are comprised of polygalactomannon derivatives having at least two different alkyl ether substituents, one of which is hydrophilic and the other which is hydrophobic.

The compounds of the present invention are particularly useful as shale stabilizers comprising water soluble copolymers which are essentially free of cross-linking. These shale stabilizers or inhibitors are adapted to be added to a drilling fluid which circulates through a well bore hole so that the shale stabilizers of the present invention contact and are adsorbed by the shale formation thereby inhibiting hydration of the shale thereby preventing its sloughing and collapse into the bore hole.

SUMMARY OF THE INVENTION

This invention is directed to the use of derivatives of polygalactomannan as oil shale inhibitors in oil drilling fluids. These derivatives of polygalactomannan contain both a hydrophilic and hydrophobic substituents. More specifically, the oil shale inhibitor compositions of the present invention are poly(alkyl ethers) of polygalactomannans having at least two different alkyl ether substituents, one of which is hydrophilic, the other hydrophobic. The hydrophilic group can be short chain alkyl ether group, for example, 2-hydroxybutyl ether. The hydrophobic group is selected from the group consisting of RO—, HOR$^1$O—, and

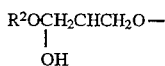

wherein R is an alkyl group which contains from about 8 to about 28 carbon atoms, wherein R$^1$ is an alkylene group which contains about 8 to about 28 carbon atoms having the —OH group on the carbon atom that is beta to the ether group, and wherein R$^2$ is an alkylene group containing from about 5 to about 25 carbon atoms. The hydrophilic substituent is present in a M.S. of about 0.2 to about 1. The other alkyl substituent, i.e., the hydrophobic substituent, is present in a M.S. of about 0.001 to about 0.2.

The compositions of this invention are efficient oil shale stabilizing or inhibiting agents for drilling oil systems either alone or combined with a surfactant. These compositions are useful in both oil, water and other general drilling systems where a stabilized shale environment is important.

DETAILED DESCRIPTION OF THE INVENTION

In U.S. Pat. No. 4,870,167, poly(alkyl ethers) of polygalactomannans are disclosed which have at least two different alkyl substituents wherein one substituent is hydrophilic and the other hydrophobic. The hydrophilic substituent can be any one known in the art such as an alkyl group having one to four carbon atoms or a hydroxyalkyl group having 2 to 4 carbon atoms which is present in a M.S. of about 0.3 to about 1.5. The hydroxyalkyl group is derived from ethylene oxide, propylene oxide and butylene oxide reacted with the polygalactomannan under alkaline conditions. As disclosed in the '167 patent the preferred hydrophilic groups are methyl, hydroxyethyl and hydroxypropyl having an M.S. of 0.5 to 1.5 with the most preferred being hydroxypropyl of M.S. 0.6 to 1.2. Other functional groups which may provide hydrophilic properties such as sulfate, sulfonate, cyanoalkyl, phosphate, siloxane and the like may alternatively be selected, the key criteria being that the polygalactomannon have at least one hydrophilic group.

In preparing the double derivative containing both hydrophilic and hydrophobic groups, the hydrophilic group reagent is reacted first with the polygalactomannan followed by the hydrophobic group reagent. It is necessary in order for the second reaction to take place that the hydrophobic reagent be compatible with the hydrophilic derivatized polygalactomannan. To obtain the required compatibility, a solvent which is miscible with the hydrophobic reagent and which swells the hydrophilically-substituted polygalactomannan is needed. However, in reactions involving polygalactomannans containing short chain substituents, i.e., less than 4 carbon atoms at a low M.S. such as less than 0.5, it is very difficult to obtain sufficient compatibility with the hydrophobic reagent for any reaction to take place. Very long reaction times and high temperatures are required to force some of the hydrophobic reagent to react. Such conditions required to force the reaction also cause degradation of the galactomannan base polymer.

The utility of the polygalactomannan is enhanced by its capability of being cross-linked to form gelled compositions and its degradability by enzymes. However, as the molecular substitution of polygalactomannan increases above about 0.4, the cross-link performance decreases due to the lack of available cis hydroxyls on the polygalactomannan backbone. Also as the M.S. increases, the enzymatic degradation of the polymer chain is decreased due to steric hindrance. For example, hydroxypropyl guar having a M.S. of 0.8 or higher cannot be easily degraded with enzymes in aqueous media. Its ability to be cross-linked is also reduced.

The hydroxypropyl, hydroxy-long-chain alkyl ethers of guar gum wherein the hydroxypropyl hydroxy group has a M.S. of at least 0.5, although valuable and useful in many applications, has limited usefulness in oil well drilling fluids wherein enzymatic degradation of the gum is used. The corresponding hydroxybutyl derivative with a M.S. of about 0.2 to about 0.5 can be enzymatically degraded and readily cross-links with the various cross-linking agents.

The oil shale inhibitor compositions of this invention are made by reacting the polygalactomannan, preferably guar gum or locust bean gum, with a hydrophilic reactant to form the hydrophilic derivative and this in turn is then reacted with a hydrophobic group, e.g., a long aliphatic chain epoxy compound which contains about 8 to about 28 carbon atoms in the alkyl group. Examples of such epoxy compounds are 1,2-epoxyoctane, 1,2-epoxydodecane, 1,2-epoxyhexadecane, 1,2-epoxytetracosane, and the like. Other useful long chain epoxy compounds are glycidyl ethers of aliphatic alcohols wherein the aliphatic alcohols contain about 5 to about 25 carbon atoms. Examples of such glycidyl ethers are the glycidyl ethers of amyl alcohol, hexanol, octanol, lauryl alcohol, stearyl alcohol, lignoceryl alcohol and the like. Examples of useful alkyl halides are octyl chlorides, decyl bromide, dodecyl iodide, hexadecyl bromide, and the like.

The M.S. of the hydrophilic group of the composition of this invention is about 0.2 to about 1 and, preferably, about 0.3 to about 0.5. The M.S. of the hydrophobic group is about 0.001 to about 0.2 and, preferably, about 0.005 to about 0.1.

The process used to form compositions of the present invention is described in detail in U.S. Pat. No. 4,870,167, which is hereby incorporated by reference.

The compounds of this invention are surprisingly and unexpectedly useful as oil shale inhibitors or stabilizers incorporated into oil bore hole drilling fluids. This water-based fluid is injected into the bore hole at a rate and pressure sufficient to purge the loose rock and soil that has been dug out by the drill bit up and out of the bore hole.

In the drilling oils of the present invention, about 10 to about 80 pounds of derivatized polygalactomannan are used per 1000 gallons of aqueous fluid, and, preferably, about 20 to about 60 pounds. The copolymer may be added to an aqueous base drilling fluid at the drilling or rig location. The amount needed will vary, of course, depending upon the particular type of aqueous drilling fluid utilized, such as brine, seawater, or the like, the weight of the given drilling fluid, and the presence and amount of other chemical additives, such as corrosion inhibitors, fluid loss additives and the like. Simple and commercially available testing techniques maybe easily utilized at the well site to determine the amount of copolymer which must be added to the circulatable drilling fluid to provide effective shale stabilization in the subterranean well. Because of the loss of material in the well, such as through adsorption onto the surface of the drilled solids and the like, it may be necessary to incrementally add portions of the copolymer to the drilling fluid from time to time to maintain the required concentration.

Generally, as is known in the art, the shale inhibition fluid of the present invention will also contain other well known drilling fluid additives such as weighing agents or a drilling mud comprised of barite, hematite and mixtures thereof in an amount sufficient to obtain a density of from about 8.3 to 18.0 lbs./gallon.

The solvent for the system utilizes water in the form of fresh water, sea water, brine, simulated brine and mixtures thereof. The drilling fluid of the present invention may also contain known clay constituents that form a colloidal solids phase such as bentonite clay, attapulgite clay, sepiolite clay and mixtures thereof. This component may comprise from about 5.0 to about 10.0 lbs per barrel of fluid, and preferably about 7.5 lbs. per barrel of fluid.

An additional gum component such as xanthan gum may be added in small amounts as a thickening agent This will be added in amounts of form about 0.1 to 1.5 lbs. per barrel and preferably in an amount of from about 0.25 to about 1.0 lbs. per barrel.

Barite (barium sulfate) or other drilling fluid additives such as calcium carbonate, hematite, etc., may be added to the drilling fluid in an amount of from about 80 lbs. to approximately 560 lbs. per barrel.

The following examples are provided to further describe and disclose the manner of making and using the inventive compositions set forth herein. They are for illustrative purposes only and it is understood that minor variations can be made thereto that do not greatly affect the compositions functionality but nevertheless are not disclosed herein. It is to be understood then that any such changes or variations still fall within the spirit and scope of the invention as recited by the claims that follow.

EXAMPLE 1

To a suitable reactor were added 1760 parts of deionized water, 168 parts of a 50 percent aqueous solution of sodium hydroxide, and 2 parts of borax. Heat was applied raising the temperature in the reactor to 190° F. Double purified guar splits, 2000 parts, were then added. The reactor was purged three times with nitrogen. The reactor was then pressurized with nitrogen to 10 psig. After 10 minutes, the temperature was adjusted to 140° F. and a vacuum of −10 inches of Hg was applied. Butylene oxide was then slowly introduced into the reactor while holding the temperature at 140° F. and keeping the pressure at no higher than 10 psig. The butylene oxide, 560 parts, was added over a three hour period with the temperature between 140° and 150° F. The reactor was then evacuated to −5" Hg and the vacuum was held for one hour. Nitrogen to 10 psig was added and the reactants were cooled to 120° F. The hydroxybutylated guar product was discharged from the reactor and was washed twice with water in a volume ratio of 10:1 water to product. The product was then centrifuged to a moisture content of 66.5 percent. The product was milled using an air inlet temperature of 400° F. followed by a second milling with inlet air at 550° F. The resulting product had a moisture content of 9.4 percent and a M.S. (hydroxybutyl substitution) of 0.31.

EXAMPLE 2

To a suitable reactor were added 90 parts hydroxybutyl guar from Example 1, 130 parts of isopropanol, 2 parts of ammonium lauryl sulfate, 36 parts of deionized water, and 18 parts of 1,2-epoxyhexadecane. Agitation was started and sparging with nitrogen was conducted for 1 hour. The temperature was raised to 70° C. and 3.75 parts of potassium hydroxide pellets were added. Heating at 70° C. was continued for 3 hours. The reactants were cooled to 25° C. and the liquid was decanted from the solid derivatized guar. The product was washed twice with acetone, was filtered to remove excess liquid, and was allowed to air dry.

EXAMPLE 3

To a suitable reactor were added 24.3 parts of a C20–C24 alpha olefin oxide having an epoxide equivalent weight of 324, 130 parts of isopropanol and 2 parts of ammonium lauryl sulfate. Heat was applied to melt and dissolve the olefin oxide in the alcohol. At 48° C., 36 parts of deionized water were added. After heating at 48°–50° C. for 15 minutes, a clear solution was obtained and 90 parts of hydroxybutyl guar from Example 1 were added. The reactor was sparged with nitrogen for 30 minutes. The temperature was raised to 70° C. and 3.15 parts of potassium hydroxide pellets were added. The temperature was held at 70° C. for 2 hours. The reactants were then cooled and were washed three times with hexane, followed by three washes with acetone. The excess liquid was drawn off on a filter and the product was air dried.

EXAMPLE 4

To a suitable reactor were added 90 parts of hydoxybutyl guar, 130 parts of isopropanol, 2 parts of ammonium lauryl sulfate, 36 parts of deionized water and 23.3 parts of 1-bromohexadecane. After sparging for 1 hour with nitrogen, the temperature was raised to 70° C. and 3.15 parts of potassium hydroxide pellets were added. The temperature was held at 70° C. for 1 hour, after which time 31 part of product were removed. After heating at 70 C. for one more hour, another 31 parts portion was removed. The remaining potion was heated for 1 more hour at 70° C. Each portion was then washed 3 times with acetone and was air dried.

The products were identified as A, B, and C corresponding to the 1, 2 and 3 hour reaction times.

EXAMPLE 5

To a suitable reactor were added 1760 parts of deionized water, 168 parts of a 50 percent aqueous sodium hydroxide solution and 2 parts of borax. The temperature was raised to 180° F. and 2000 parts of double purified splits were added. The reactor was purged 3 times with nitrogen and nitrogen was then added to a pressure of 10 psig. After holding the pressure for 10 minutes, the temperature was adjusted to 160° F. and the reactor was evacuated to −10 in. Hg. The addition of 560 parts of butylene oxide was begun and continued over 1 hour and 30 minutes with the temperature rising from 161° F. to 178° F. The temperature was lowered to 140° F., at which point a solution of 150 parts of 1,2-epoxyhexadecane in 500 parts of isopropanol was added. After holding at 140° F. for 30 minutes, the temperature was raised to 170° F. and was held for 2 hours. The temperature was then lowered to 78° F. The product was discharged from the reactor and was washed twice with water at a 10 to 1 water to product ratio. The washed product was centrifuged to a moisture content of 68.4 percent and was then milled using inlet air of 550° F. The resulting product had a moisture content of 8.9 percent and a mesh size of less than 150 (U.S. Standard Sieve).

EXAMPLE 6

Half percent solutions of the derivatized guar from Examples 2, 3, 4 and 5 were made in deionized water. The pH of the solutions was adjusted to 6.0 with hydrochloric acid. The solutions were stirred for one hour. To 400 parts of each solution were added 0.2 part of a 28 percent solution of ammonium lauryl sulfate (ALS) in water. The viscosity was then determined using a Brookfield viscometer at 20 RPM. After each viscosity determination, additional ammonium lauryl sulfate was added in 0.2 part increments and the viscosity was determined after each addition.

EXAMPLE 7

In order to effectively evaluate the performances of the claimed polygalactomannon compounds as oil shale inhibitors, into each of three (3) beakers was placed a 2.5 inch piece of bentonite shale. Into beaker A was then added 350 mls. of a 1.0% partially hydrolyzed polyacrylamide solution (Alkafloc EA-173; Rhone-Poulenc, Cranbury, N.J.) a known oil shale inhibitor known in the art. Beaker B has 350 mls. of a 1.0% derivatized polygalactomannon solution of the present invention added while beaker C served as the control as it contained 350 mls. $H_2O$.

After soaking for twenty-four (24) hours, the bentonite shale samples were observed for their degree of integrity.

The more firm and intact the sample, the less water absorbed by the bentonite and the better the composition performed as a shale inhibitor. Whereas samples A and B remained fairly well defined, the derivatized polygalactomannan sample was firmer and actually more well defined than the prior art sample A which was somewhat mushy indicating some degree of water absorption. Meanwhile, example C was completely dispersed in solution as would be expected for water. Hence, the derivatized polygalactomannan compositions of the present invention outperformed that of the prior art and almost performed as well as a drilling mud which provides the highest possible degree of shale inhibition.

What we claim is:

1. A method for the stabilization of a hydratable shale formation during a well drilling which comprises contacting at least a portion of the hydratable shale formation with an amount that is effective to inhibit shale hydration, of a composition comprising:

a) a polygalactomannan having hydrophilic groups and hydrophobic groups wherein said hydrophilic groups are selected from the group consisting of 2-hydroxybutyl ether, hydroxyethyl, hydroxypropyl, and alkyl groups having between one and four carbon atoms and mixtures thereof wherein the hydrophilic Substituent is present in an M.S. from about 0.2 to about 1 and wherein said hydrophobic groups are selected from the group consisting of RO—, $HOR^1$—O— and $R^2OCH_2C(OH)HCH_2O$— wherein R is an alkyl group which contains about 8 to about 28 carbon atoms, wherein $R^1$ is an alkylene group which contains about 8 to about 28 carbon atoms having the —OH group on the carbon atom that is beta to the ether group, and wherein $R^2$ is an alkyl group containing from about 5 to about 25 carbon atoms and wherein the hydrophobic substituent is present in an M.S. of about 0.001 to about 0.2;

b) one or more drilling fluid additives selected from the group consisting of weighing agents and drilling mud and mixtures thereof; and c) water or brine.

2. The oil shale inhibitor composition of claim 1 further comprising a thickening agent.

3. The method of claim 1 wherein the polygalactomannan is guar gum.

4. The method of claim 1 wherein the polygalactomannan is locust bean gum.

5. The method of claim 1 wherein the $HOR^1O$— group is a hydroxydodecyl ether group.

6. The method of claim 1 wherein the $HOR^1O$ group is a hydroxyhexyldecyl ether group.

7. The method of claim 1 wherein the M.S. of said hydrophobic substituent is from about 0.005 to about 0.1.

8. The method of claim 2 wherein said thickening agent is xanthan gum.

9. The method of claim 1 wherein the M.S. of said hydrophilic groups is between from about 0.3 to about 0.5.

* * * * *